Nov. 10, 1931.   J. J. A. MILLER   1,831,074
ATTACHING MEANS FOR TOW LINES, SLINGS, AND THE LIKE
Filed March 25, 1931
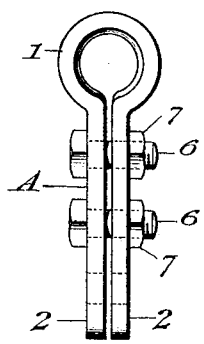
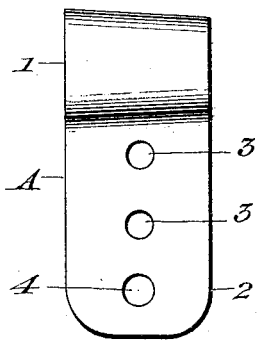
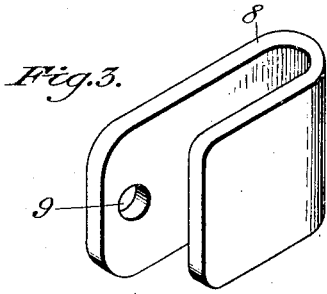
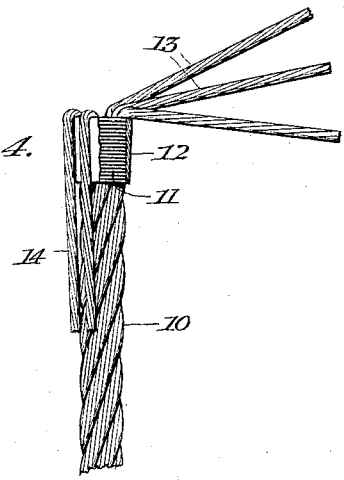
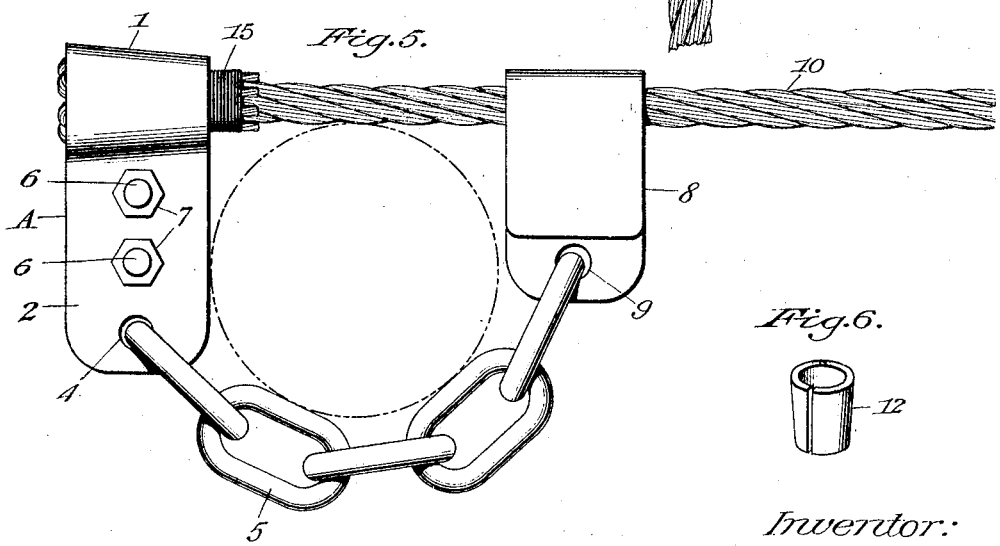
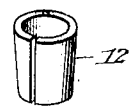
Inventor:
John J. A. Miller,
By G. Sargent Elliott
Attorney.

Patented Nov. 10, 1931

1,831,074

UNITED STATES PATENT OFFICE

JOHN J. A. MILLER, OF DENVER, COLORADO

ATTACHING MEANS FOR TOW LINES, SLINGS, AND THE LIKE

Application filed March 25, 1931. Serial No. 525,203.

My invention relates to attaching means for tow lines, slings and the like, and is designed as an improvement over a similar device for which a United States Patent was granted to me on February 10, 1931, No. 1,791,631.

The main object of the invention is to provide an improved attaching device and manner of securing the same upon the end or ends of a cable or rope, so that the said cable or rope can be used as a tow line or sling or for other purposes.

Further, to provide a clip having a tapered eye to receive a tapered enlargement on the end of a cable, and a hook which is connected to said clip by a short length of chain, whereby the cable can be attached to an object, such as the axle of an automobile, by passing the chain around the axle and hooking the hook to the cable, such arrangement permitting a direct pull on the cable in line with the tapered eye of the clip, thus eliminating the bending of the cable where it is engaged by the hook, and the consequent wearing or cutting of the cable.

Further, to provide an improved method of forming the tapered enlargement on the end of the cable.

These objects are accomplished by the device illustrated in the accompanying drawings, in which:

Figure 1 is an edge view of the clip,

Fig. 2 is a side view thereof,

Fig. 3 is a perspective view of the hook,

Fig. 4 is a side view of a portion of a cable, showing the manner of forming the tapered enlargement on the end of the same.

Fig. 5 is a view showing a short length of cable, the clip thereon, and the hook connected to the clip by a short length of chain, the hook engaging the cable as when the cable is attached to an object; and Fig. 6 is a perspective view of the split tapered sleeve.

Referring to the accompanying drawings:

The letter A refers to the clip, which is formed of a flat metal strip of suitable length, and preferably about one inch and a quarter wide and of sufficient thickness to give it the required strength for the purpose intended. The strip is bent centrally upon itself, and at the bending point the strip is formed with a tapered eye 1, from which point the opposing side members 2 of the clip, which are about one and one-half inches long, extend parallel and close together. The members 2 are provided with registering bolt holes 3, and at their ends with registering holes 4, for connection therewith of one end of a short chain 5. Bolts 6 are passed through the holes 3, and are provided with clamping nuts 7, which are adapted to clamp the side members of the clip together.

The opposite end of the chain 5 has connected thereto a hook 8, which is in the form of a flat metal strip which is bent upon itself to form spaced parallel members, one of which is slightly longer than the other and is provided with a hole 9, to receive the end link of the chain 5. The cable 10, to which the clip is secured, is five-sixteenths of an inch in diameter, but larger or smaller cables may be used to meet requirements. It is necessary to form a tapered enlargement on the end of the cable, which is adapted to be secured within the tapered eye of the clip, and this is accomplished in the following manner: A thin wire is wound several turns about the cable, and at a slightly greater distance from its end than the width of the clip, as shown at 11 in Figure 4. This end portion of the cable is then passed through the small end of the tapered eye of the clip, and a split tapered sleeve or thimble 12 is then placed on the cable around the windings 11. The strands of the cable, from the windings 11 to its adjacent end, are then untwisted to separate the individual strands, as shown at 13 in Figure 4, and the strands are then bent down over the thimble 12 and against the cable, as shown at 14, the said thimble forming a tapered annular enlargement on the cable, which causes the strands, when folded back against the cable, to incline inward from their bending points to their free ends, so that, as a whole, they form a tapered enlargement. This enlarged end of the cable is then drawn into the eye of the clip, and the nuts 7 on the bolts 6, are turned to clamp the two side members of the clip tightly together, thereby contracting the opening in the tapered eye, which is thus firmly clamped upon the said enlargement of the cable. The end portions of the strands which extend beyond the smaller end of the eye are then wrapped with a few turns of wire, as shown at 15, the ends of which are soldered to prevent unwinding, and the winding 15 prevents any possible inward slipping of the clip from the enlargement, while the combination of the tapered enlargement and the tapered eye which is clamped thereon, prevents any possible disconnection of the clip from the cable. When used as a tow line, both ends of the cable would be provided with the clip, chain and hook, and the ends of the cable would be secured, respectively, to the rear axle of the towing car and the front axle of the car to be towed, by passing the chains around the axles and hooking the hooks over the cable in the manner shown in Fig. 5.

Having described my invention, what I claim as new and desire to secure by Letters Patent, is:

1. In a device of the character described, a cable, a tapered enlargement on the cable adjacent the end thereof, the strands of said cable being bent back over said tapered enlargement and against the cable, a clip having a tapered eye to receive such enlargement, means for contracting said eye and maintaining the same in clamping relation to said enlargement, and a chain connected at one end to said clip and having a hook on its opposite end.

2. In a device of the character described, a cable, a tapered sleeve on the cable adjacent the end thereof, the strands of said cable being bent back over said sleeve and against the cable to form a tapered enlargement, a clip comprising a body portion having a tapered eye on one end thereof to receive the tapered enlargement, means for contracting the eye and maintaining the same in clamped relation to said enlargement, and a chain connected to the free end of said clip, and having a hook on its opposite end.

3. In a device of the character described, a cable, a tapered sleeve on the cable adjacent the end thereof, the strands of said cable being bent back over said sleeve and against the cable to form a tapered enlargement, a clip comprising a metal strip bent upon itself to form parallel members, a tapered eye being formed at the bending point to receive the said tapered enlargement, and means for clamping the said parallel members together and maintaining them in clamped relation, thereby contracting the tapered eye upon the said enlargement, and a chain connected to the free end of said clip and having a hook on its opposite end.

4. In a device of the character described, a cable, wire windings on said cable near the end thereof, a split tapered sleeve on said cable around said windings, the strands of said cable being bent back over said sleeve and against the cable to form a tapered enlargement thereon, a clip comprising a metal strip bent centrally upon itself to form parallel members, a tapered eye being formed at the bending point to receive said tapered enlargement, bolts extending through said parallel members and nuts thereon to clamp said members together, thereby contracting the tapered eye upon the said enlargement, a chain connected to the free end of said clip and having a hook on its opposite end.

5. Mechanism according to claim 3, in which the bent back strands extend through and beyond the small end of said tapered eye, and a wire which is wound about the said extended ends of said strands.

6. In a device of the character described, a cable, a clip secured upon the end thereof and a chain attached to said clip and having a hook on its opposite end.

In testimony whereof, I affix my signature.

JOHN J. A. MILLER.